(12) United States Patent
Reudink et al.

(10) Patent No.: US 6,621,454 B1
(45) Date of Patent: Sep. 16, 2003

(54) ADAPTIVE BEAM PATTERN ANTENNAS SYSTEM AND METHOD FOR INTERFERENCE MITIGATION IN POINT TO MULTIPOINT RF DATA TRANSMISSIONS

(75) Inventors: Mark D. Reudink, Seattle, WA (US); Bruce C. Rothaar, Woodinville, WA (US); Jerry Prismantas, Federal Way, WA (US)

(73) Assignee: Vectrad Networks Corporation, Kirkland, WA (US)

( * ) Notice: Subject to any disclaimer, the term of this patent is extended or adjusted under 35 U.S.C. 154(b) by 222 days.

(21) Appl. No.: 09/853,046

(22) Filed: May 10, 2001

(51) Int. Cl.$^7$ .................................................. H04B 7/00
(52) U.S. Cl. ........................ 342/367; 342/368; 342/374; 455/278.1
(58) Field of Search .................................. 342/367, 368, 342/374; 455/278.1

(56) References Cited

U.S. PATENT DOCUMENTS 5,563,610 A    10/1996  Reudink
5,805,977 A  *  9/1998  Hill et al. .................. 455/31.3

* cited by examiner

Primary Examiner—Theodore M. Blum
(74) Attorney, Agent, or Firm—Fulbright & Jarworski L.L.P.

(57) ABSTRACT

A system for mitigating the effects of interference in an unlicensed RF band for point to point data transmissions comprises a multibeam antenna locating interference with transmission to and from data transmission subscribers. A scanner determines the frequency, bandwidth and any periodicity of the interference. Separate scanners can be used for each antenna beam. Nulls are generated in the data transmission antenna pattern in the direction of the interference during periods of interference. Communications with subscribers in a direction of the interference is carried out using a different channel or is scheduled around the interference occurrences. Alternatively, such subscribers are directed to establish data transmissions with an alternate hub antenna.

22 Claims, 4 Drawing Sheets

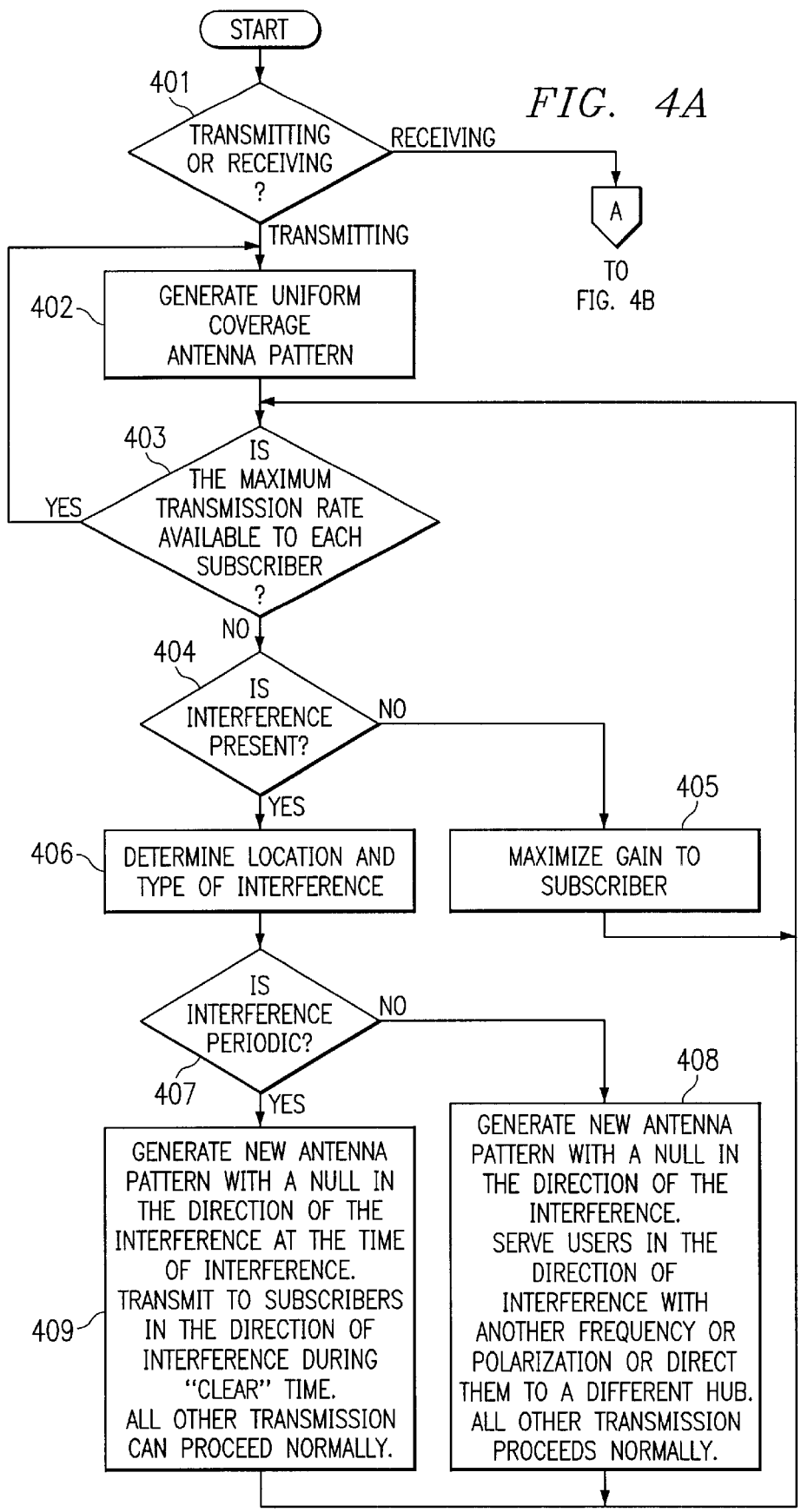

ADAPTIVE BEAM PATTERN ANTENNAS SYSTEM AND METHOD FOR INTERFERENCE MITIGATION IN POINT TO MULTIPOINT RF DATA TRANSMISSIONS

BACKGROUND

Currently, there are several so-called "last mile" and "last foot" data transmission systems which are designed to deliver high speed and/or high data capacity from the internet backbone to the end user. Several such systems use RF transmission to replace copper wire or fiber optic cables. Some of these systems are called point to point or point to multipoint systems and operate in the various licensed and unlicensed RF bands. A fundamental characteristic of such existing systems is that their RF transmissions occur in a frequency spectrum protected and regulated by a government body. These protected frequency spectrums, or bands, are licensed to certain license holders and only a few may operate in any given physical area depending upon the number of licenses available.

When operating in a licensed band the interference between transmissions is primarily self-interference and is thus controllable. Accordingly, noise (interference from another transmitter on the same frequency or on an interfering frequency) originates from a known source.

License holders are afforded protection from interference that is not self-generated which occurs within their allocated frequency band. Thus, in a protected band, if an interferer is detected, the licensed user could notify the FCC (or other regulating agency) and request that the agency investigate and rectify the problem. The regulations in the unlicensed bands differ in that systems must be designed to operate in the presence of interference and, in addition, must not generate interference. There are strict usage guidelines for the unlicensed spectrum. If an operator's equipment in not able to tolerate interference from a system complying with the FCC guidelines, then the operator cannot appeal to the FCC to alleviate the problem.

In licensed bands, such as the cellular telephone bands; the wireless multichannel multipoint distribution service (MMDS) frequencies, which are also used for fixed wireless; or local multipoint distribution service (LMDS) used for fixed wireless; if an operator were to detect interference in the band that was not self interference, the recourse would be to contact the FCC in order to have the government identify that source of interference and have the offending provider reduce or remove that interference. These bands are licensed, have been paid for and are owned by a certain operator.

Another method for reducing interference in the licensed bands, for a cellular or fixed wireless system, is through frequency planning of the system. The only true interference of concern within these licensed bands is self-interference. So, the operator is responsible for creating a system that has acceptable levels of background interference. Traditionally, operators have mitigated interference through frequency planning, cell location and sectorization of antennas. However, use of more sophisticated techniques is generally not necessary.

There are only a limited number of licensed bands in any geographic area, thus, in order to widen the choices consumers have, it is desirable for service providers to be able to use unlicensed RF bands to provide capability to deliver high speed, high capacity data services. In addition, a service provider may not hold licenses in every geographic area that it desires to provide service. Therefore, use of the unlicensed frequency bands may allow a service provider to cover a greater area.

In 1997 the FCC created a wireless arena called Unlicensed National Information Infrastructure (U-NII). System operators are free to operate wireless equipment in three sub-bands (5.15 to 5.25 GHz, 5.25 to 5.35 GHz and 5.725 to 5.825 GHz) without acquiring a licensed frequency spectrum. Part 15 of the FCC document specifies the conditions for operating wireless equipment in the U-NII frequency band. However, operators are not protected from possible interference from other U-NII operators transmitting in the vicinity or even other systems which utilize the same frequencies.

The IEEE, a standards group, is defining a wireless LAN standard, referred to as IEEE 802.11a for operation in the U-NII band. Equipment that conforms to this standard will operate indoors at the lower and middle frequency sub-band i.e. 5.15 to 5.25 GHz and 5.25 to 5.35 GHz. The ETSI BRAN group in Europe has defined an air interface standard for high-speed wireless LAN equipment that may operate in the U-NII frequency band. Equipment that is compatible with this standard may cause interference with use of these unlicensed bands.

One major problem with the use of such unlicensed bands is that it is very difficult, if not impossible, to control RF interference from other users of the unlicensed band. These other users may be using the selected unlicensed band for uses which are essentially different from that employed to deliver communication services. For example, the 5.25 to 5.35 GHz and 5.725 to 5.825 GHz bands are available for use for outdoor data communication between two points. This is typically a wideband use. The same bands are also available for other applications including users such as government radar. When the same band is used for wideband communication, and also used by others for uses such as radar, data communications between sending and receiving antennas will experience significant interference from radar pulses, which are broadcast over a wide area in repetitive bursts.

In the current state of the art, there is no discrimination between narrow band or wideband interference. When interference is detected, it is usually based on a signal to noise ratio for any given channel, then the radio switches to a lower order modulation, from either 64QAM to 16QAM, or 16QAM to QPSK, or QPSK to BPSK. Such a lower modulation shift allows more tolerance for noise and interference, but significantly reduces the data rate. Similarly, for Orthogonal Frequency Division Multiplexing (OFDM), the modulation order of the subcarriers is optimized for any given signal to noise ratio.

The prior art of radar interference mitigation is intended for use in currently licensed RF bands. However, radar interference is not an issue of great concern in licensed bands because there is little or no such interference. Most licensed bands are free and clear of other harmful interferers originating from outside sources. Additionally, most unlicensed bands do not have strong radar interferers. However, there is other low level interference in the unlicensed RF bands. This interference is at a much lower level and has a different signature than high powered radar. Therefore, generally speaking, prior art interference mitigation systems do not detect radar interference nor do they attempt to avoid it.

An important issue in unlicensed frequency band data transmission is the large amount of interference that can be present within the system. Interference is generated within the system, as well as coming from outside sources. Interference can come from other operators in the U-NII bands, point-to-point microwave links operating in the bands, or high powered radar systems. In order to deploy a system with high through-put using these bands, it is necessary to mitigate the interference caused by these different sources. The interferences of primary concern for the present invention are point-to-point microwave links and radar pulses, due to their high power. Microwave link power can be on the order of 10 to 20 dB higher power than the output allowed for unlicensed point to multipoint systems. Radar systems can also be significantly higher powered, and thereby a destructive interference source for an unlicensed data transmission system. The two different types of interference have different impacts on the design of a RF data transmission network.

Generally speaking, these interferences are somewhat unique to unlicensed bands. It is practically impossible to keep out and control unwanted frequencies in these bands. The bands are by definition unlicensed and therefore available to anyone to use as long as the equipment complies with the FCC rules governing the unlicensed band The creation of multiple antenna beams in the creation of specific antenna patterns, either permanently or from time to time, is well known in the art. For example, Reudink, U.S. Pat. No. 5,563,610, in part, shows such a system and is hereby incorporated by reference herein.

SUMMARY OF THE INVENTION

The present invention is directed to a system and method for point-to-multipoint RF data transmission interference mitigation using adaptive beam pattern (smart) antennas. A primary advantage of smart antennas in a fixed wireless data communication system is maximization of control over the radio frequency (RF) environment. Smart antennas can be used to increase the link signal margin by providing higher gain than conventional antennas and reduce multipath effects due to use of narrow, highly directional, antenna beams. The resultant reduction in interference, resulting in an increase in the carrier to interference (C/I) ratio, allows the use of higher levels of modulation resulting in increased through-put and/or increased range.

Fixed wireless data transmission systems operating in the unlicensed frequency bands face somewhat unique challenges. The interference present in these unlicensed bands is not necessarily a result of self interference, as common in licensed bands, but interference from foreign, outside sources. These foreign sources could include competing operators in the same band, point-to-point microwave links that are permitted to operate at higher power than point to multipoint data transmission systems, pulsed radar systems, or the like.

The interference sources of primary concern for the present invention are point-to-point microwave links and radar pulses. The present smart antenna system is able to identify the sources of interference and adapt the antenna pattern in order to mitigate the interference. The antenna pattern is adaptive in azimuth, elevation, range, and/or polarization. The adaptations differ between the uplink and downlink, and are used in combination with other interference mitigation techniques.

For example, a system, with a fixed coverage downlink channel and an adaptive uplink in which a periodic radar source interferes with communications from the subscriber units to the hub, if the location of the interference can be identified, the antenna system will place a null in the direction of the radar pulse. This way communication with other subscriber units can continue even when interference is present. Simultaneously, the hub will schedule transmissions from the subscriber that are not coincident with the radar pulse.

A continuous source of interference, such as a point-to-point radio, may result in certain portions of a cell being unavailable for coverage on a particular frequency, forcing a subscriber to communicate with an alternative hub, or changing frequencies between the subscriber and optimal hub.

The preferred method to deal with high levels of interference in the unlicensed band is through the use of smart antenna systems. Smart antennas can take different forms, with a simple smart antenna being a switched beam system. Such a system employs multiple narrow beams covering a sector. A sector may be, by way of example, 60 degrees to 120 degrees, or a full 360 degree area. Since narrow beams cover less area than a wide beam system, a reduced amount of interference is built into the network. Advantageously, the users of a fixed wireless system are, by definition, fixed and not moving. This allows scheduling of transmissions and receptions from particular users to take place on narrow beams around interference. Generally, each sector is assigned a specific frequency or set of frequencies.

More sophisticated smart antennas introduce nulls in the direction of interference. This enables communication with a user adjacent, but not in direct line with, the source of interference. For example, if a fixed point-to-point microwave link is in a particular direction from a base station, a null can be created in that direction, for that particular frequency and for that particular polarization. This allows communication with the users in other directions on that same frequency with the same polarization resulting in continued maximization of frequency use or through-put on the available band. To serve users in the direction of the interfering point-to-point source, either a different frequency or a different polarization can be used. Similar methods can be utilized for a pulse radar system, for example, where the interference is of a known periodicity, and the system reacts periodically to blank out data transmission in the direction of the interference coming from the radar.

Other irregular interference can be detected and nulls created to optimize the system to mitigate the effect of the interferences. Factors which must be taken into account for irregular interference includes the duration of the interference, the intensity and width of the interference, both in bandwidth and azimuth.

The present, sophisticated smart antenna system can steer in three dimensions. Therefore, the desired user can be located both in azimuth and elevation. The resultant communication is directly with that user and only with that user. This helps reduce self-interference throughout the network, since the data transmission system is not generating interference to different users within the system. It also helps avoid interfering with others using the unlicensed bands.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4A is a flow chart of the present method for point-to-multipoint RF data transmission interference mitigation using adaptive beam pattern antennas, for transmissions.

DETAILED DESCRIPTION

Figure 1A:
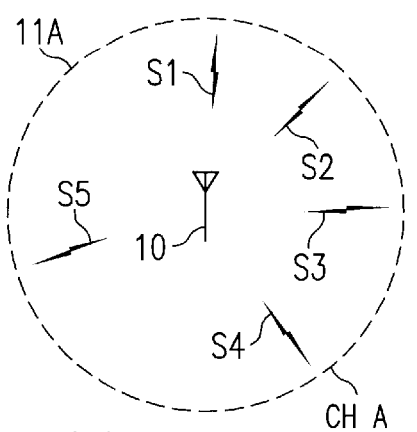
FIG. 1A is a digramatic representation of an antenna beam pattern best suited for a system free of interference.

Turning now to FIG. 1A there is shown antenna base station or hub antenna 10 with a plurality of subscriber stations S1 through S5, all in direct communication with hub antenna 10. The subscriber units S1 through S5 generally use directional antennas directed at the hub to communicate with central hub antenna 10. Generally, FIG. 1A shows a system that is not experiencing any interference. The antenna pattern 11A is generally circular, because there is no need to distort the pattern. This pattern or cell 11A is initially designed to give maximum communication coverage to the subscribers that are currently in communication with antenna 10.

Generally speaking, the hub antenna is comprised of several sectorized antennas, by way of example, 60 degrees wide. Six such sectorized antennas are used to create omnidirectional coverage. A conventional omnidirectional antenna would not be utilized, due to an inability to take full advantage of available frequencies through a frequency reuse plan. Nonetheless, coverage by the sectorized antennas would be uniform, assuming flat earth and terrain. In FIG. 1A, the coverage is provided by channel A. A channel in the present RF data transmission system is a frequency with an associated polarization. The same channel might not be used to cover 360 degrees. For example, each of the sectors of the sectorized antennas could have a particular channel, frequency and/or polarization.

Figure 1B:
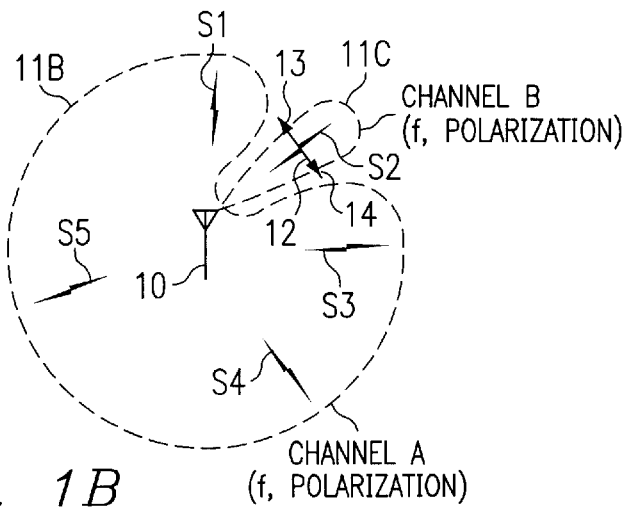
FIG. 1B is a digramatic representation of an antenna beam pattern having a null in the direction of a point-to-point interference and with an alternate channel directed to a subscriber in the null.

With attention directed to FIG. 1B, we see that the coverage of the cell has been disrupted by point-to-point link 12. Points 13 and 14 are the end points of point-to-point link 12. Link 12 is using the same frequency used in the sector which contains subscriber S2. If the interfering link 12 was not present, it would not be necessary to change frequency. However, the frequency in use by adjacent cells or sectors might dictate use of the present frequency.

Because the RF data transmission system is using unlicensed bands, there can be another point-to-point system with an interfering signal 12, which is using the same, or an interfering, frequency or channel. If communication between hub antenna 10 and subscriber S2 on the same frequency as the rest of the subscribers was desired, it would be necessary to switch all of the subscribers S1–S5 to a different frequency.

However, using the present invention as shown in FIG. 1B, there is constructed a radiation pattern 11B, which creates a null in the direction of signal 12. Pattern 11B uses the same channel, A as shown in FIG. 1A, with the same frequency and same polarizations. Therefore, all of the subscribers, except for subscriber S2, would continue to communicate on the same frequency and same polarization as previously shown in FIG. 1A. Thereby, the frequency plan throughout the system can be maintained. If an interfering point-to-point link 12 is established after the cells are deployed, it is compensated for through the use of a smart antenna changing the beam pattern. Generally, such interfering links will not cover a large portion of a cell. Therefore only a small part of the cell, by way of example, a five degree wide path, would need to be altered in order to compensate. Within the null of pattern 11B, there is created another channel, channel B, shown with radiation pattern 11C. Hence, a different frequency and/or polarization from the frequency and/or polarization from the interfering signal 12 is used to communicate with subscriber S2.

Figure 2A:
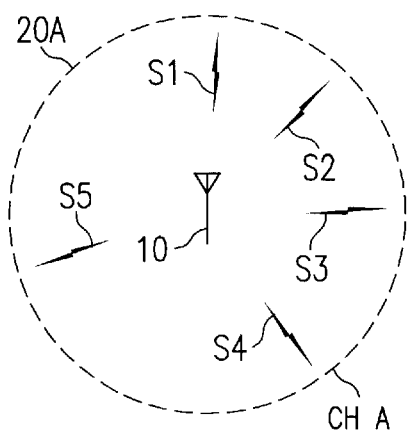
FIG. 2A is a digramatic representation of an antenna beam pattern best suited for a system free of interference.
Figure 2B:
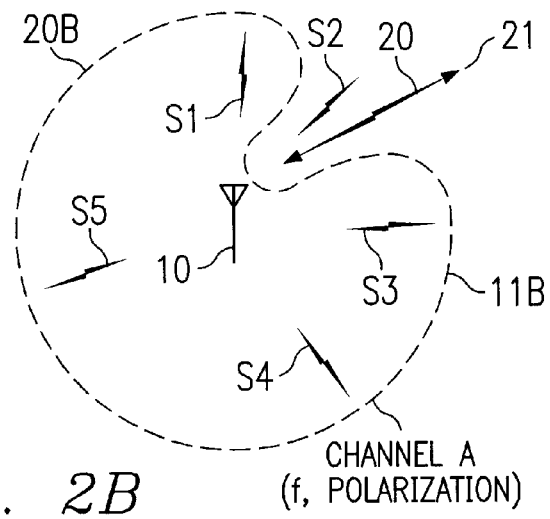
FIG. 2B is a digramatic representation of an antenna beam pattern having a null in the direction of a wideband interference source.

FIG. 2A shows a uniform interference free antenna pattern similar to FIG. 1A. As shown in FIG. 2B a high power periodic interferer 21 sends a signal 20 into the radiation pattern 20A. The uniform radiation pattern 20A, shown in FIG. 2A, will be sufficient during times when interfering source 20 is not present. The difference between interfering source 20 and point-to-point link 12, described in relation to FIG. 1B, is that source 20 is a wideband interfering source. No communication could take place in the entire U-NII band while such interference is present. Therefore, another frequency or polarization could not be used at that specific time to serve user S2. The affected user S2 could only be served when interfering source 20 is not present. Instead of ceasing communications with all users during the period that interfering source 20 is present, radiation pattern 20B can be generated. Thereby, communication is maintained with the other users in the cell, such as S1 and S3–S5 during the time of interference. When the interference is removed the cell reverts back to antenna pattern 20A, serving all the users, including user S2.

The interfering sources, either periodic source 20 or point-to-point link 12 can be identified using omnidirectional antennas or through directional antennas. The disadvantage of using an omnidirectional antenna is that the exact location of the source is difficult to ascertain. To facilitate creation of an antenna pattern from the hub that involves such an interfering source, the location and/or direction of the interfering source needs to be known. The location of the source can be found using multiple narrow beam antennas. For example, if the cell is divided up into 36 sectors, each sector using a 10 degree antenna, then the location of the interfering source can be narrowed down to a 10 degree arc.

Figure 3:
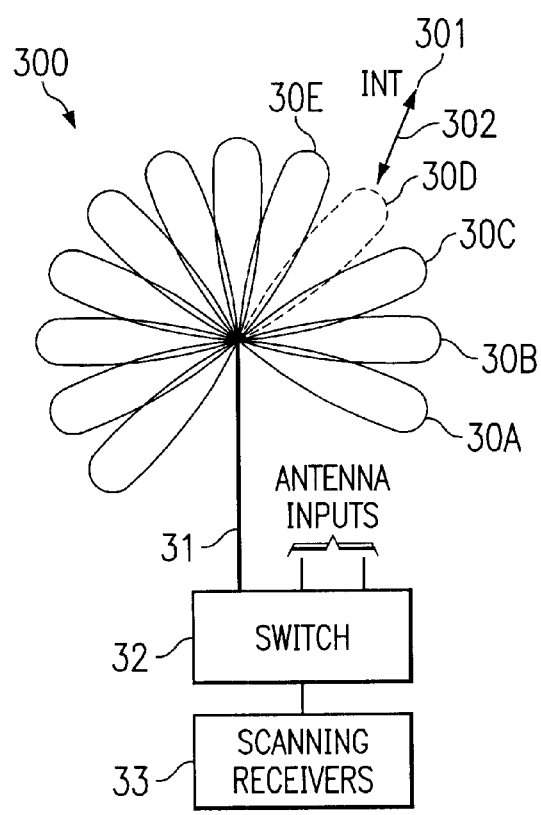
FIG. 3 is a digramatic representation of an antenna beam pattern for locating an interferer and forming a null in the direction of the interferer.

FIG. 3 shows one implementation where multiple narrow beams, such as beams 30A–E, are used to cover a cell site. These antenna beams may be used only to identify the location of an interferer, or also for communication. For example, interfering source 301, generating interfering signal 302 is found on beam 30D. Connection 31 extends between the antennas generating beams 30A–E and switch 32. The switch 32 is in turn connected to scanning receiver 33. The scanning receiver 33 is capable of scanning all of the frequencies in the band of interest. Alternatively, multiple scanning receivers 33, for example, one per beam will allow elimination of switch 32. Multiple scanning receivers might be necessary in order to identify pulses that have a very short duration. Scanning receivers 33 activates switch 32 in response to identification of an interference source, controlling input to the antennas. Using the scanning receiver, switch and antenna system the direction of the interference can be determined, which facilitates creating the radiation pattern shown in FIGS. 1B and 2B.

When interference does not impinge on base station antenna 10, but does impinge on one or more subscribers S1–S5, then the subscribers losing communications report back to the base station. Alternatively, a subscriber's lack of acknowledgment of the proper signals would tell the base station that there is an interferer with respect to that/those subscriber stations. In response to the report or lack of acknowledgment, the antenna pattern of the base station is modified to accommodate the interfering signal.

The present method of an adaptive antenna pattern can be used in a frequency duplex system where transmission and reception are taking place on different frequencies. In such case different patterns can be generated for transmission and reception. For example, point-to-point link 12 may only disrupt hub reception from users, but transmission to those users might not be impaired. Also, these patterns are easily generated with a TDD system where the same frequency is used for both transmission and reception but at different times. In this case, if the interference is periodic or comes at a known time, the scheduling of the transmission can take place around occurrences of the interference.

Turning to FIG. 4A the method for practicing the present invention when transmitting is illustrated. Once a determination is made at 401 that the system is transmitting, a general uniform coverage antenna pattern is generated at box 402. The transmission rate available to each subscriber is monitored at box 403. If the transmission rate is optimal then the uniform coverage antenna pattern is maintained. However, if this rate is not optimal a determination is made at 404 whether interference is present. If interference is not present then the gain to the subscriber is increased at box 405 and a determination of the available transmission rate is again made at 403. If at 404 it is determined that interference is present, the location or direction of the interference and its type are determined at box 406. Then at 407 a determination is made as to whether the interference is periodic. If a determination at 407 is made that the interference is not periodic then, a new antenna pattern is generated with a null in the direction of the interference, box 408. Users in the direction of the interference are served using a alternative frequency and/or polarization, box 408. Alternatively, the effected subscribers can be directed to use a different hub, box 408. All other transmissions to subscribers outside the null proceed normally, box 408. If a determination is made at box 407 that the interference is periodic, a new antenna pattern with a null in the direction of the interference, coinciding with the occurrence of the interference is created, box 409. Transmissions to subscribers in the direction of the interference are made during clear times when the interference is not present and all other transmissions proceed normally, box 409. Then the maximum transmission rate available to each subscriber is again evaluated at 403 and the process, steps 404 through 409 repeated.

Figure 4B:
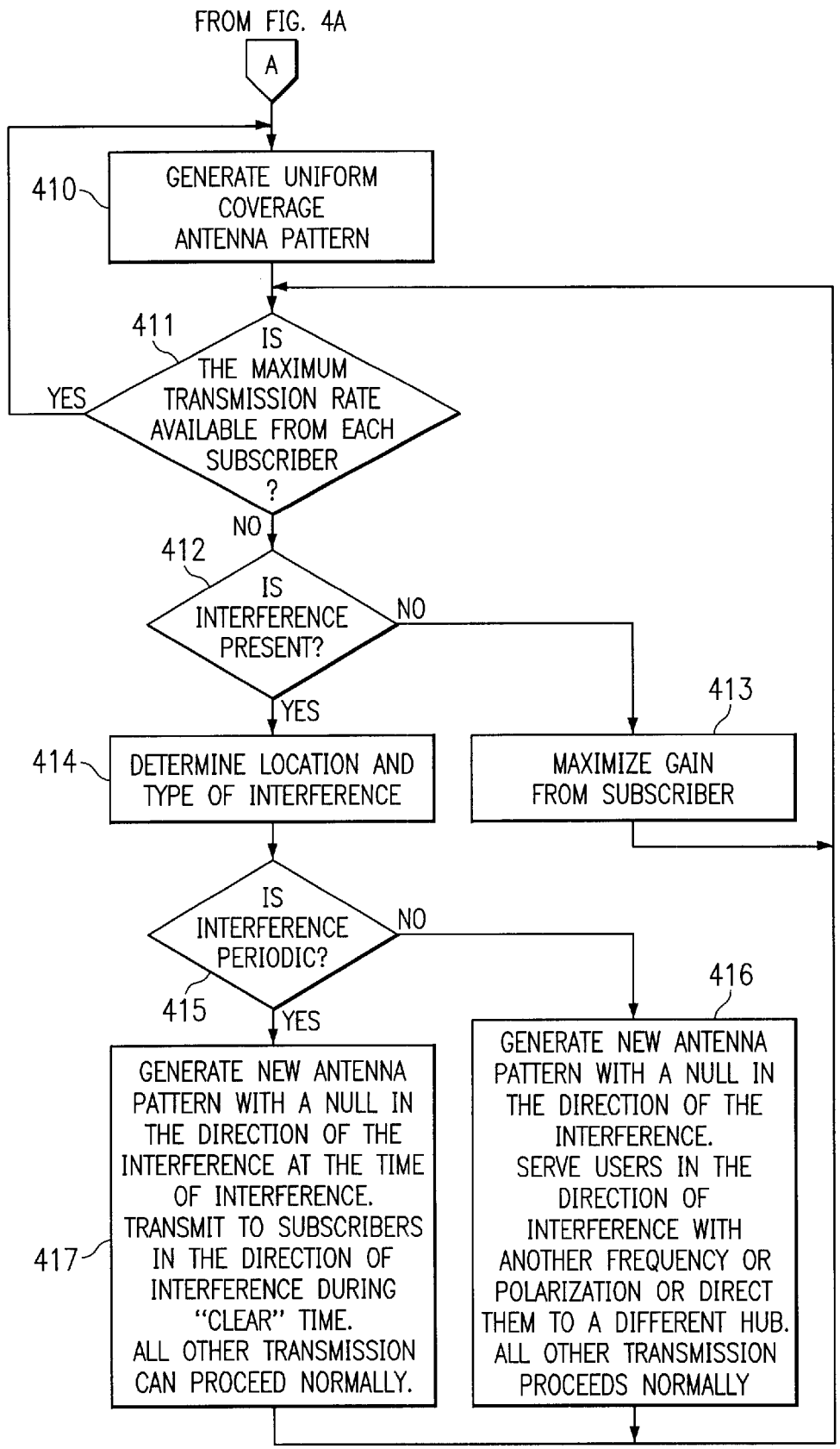
FIG. 4B is a flow chart of the preset method for use with reception.

Once a determination is made at 401 that the system is transmitting, the method for practicing the present invention when transmitting as illustrated in FIG. 4B is employed. A general uniform coverage antenna pattern is generated at box 410. The transmission rate available from each subscriber is monitored at box 411. If the transmission rate is optimal then the uniform coverage antenna pattern is maintained. However, if this rate is not optimal a determination is made at 412 whether interference is present. If interference is not present then the gain from the subscriber is increased at box 413 and a determination of the available transmission rate is again made at 411. If at 412 it is determined that interference is present, the location or direction of the interference and its type are determined at box 414. Then a determination is made as to whether the interference is periodic, at 415. If a determination at 415 is made that the interference is not periodic, then as indicated in box 416, a new antenna pattern is generated with a null in the direction of the interference. Users in the direction of the interference are served using a alternative frequency and/or polarization, box 416. Alternatively, the effected subscribers can be directed to use a different hub, box 416. All other transmissions to subscribers outside the null proceed normally, box 416. If at 415 it is determined that the interference is periodic, a new antenna pattern with a null in the direction of the interference, coinciding with the occurrence of the interference, is created, box 417. Transmissions to subscribers in the direction of the interference are made during clear times when the interference is not present, box 417. All other transmissions proceed normally, box 417. Then the maximum transmission rate available from each subscriber is again evaluated at 411 and steps 412 through 417 of the process are repeated.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for mitigating the effects of interference in an RF band data transmission system wherein transmitter and receiver are in fixed relationship to each other, said method comprising the steps of:

discerning a relative transmission rate to and from at least one subscriber of said data transmissions;

locating any interference with transmission to and from said subscriber;

ascertaining a type of said interference;

determining if said interference is periodic; and generating a data transmission antenna pattern with a null in the direction of said interference during said interference.

2. The method of claim 1 wherein said generating step further comprises the step of creating a plurality of narrow antenna beams.

3. The method of claim 2 wherein said creating step further comprises creating antenna beams in directions other than the direction of said interference, during said interference.

4. The method of claim 2 further comprising the step of serving at least one of said subscribers in a direction of said interference with a different channel.

5. The method of claim 4 wherein said generating step further comprises creating an alternate channel narrow antenna beam in the direction of said subscriber, during said interference.

6. The method of claim 5 wherein said channel comprises a frequency and a polarization.

7. The method of claim 1 further comprising the step of directing at least one of said subscribers located in the direction of said interference to establish data transmissions with an alternate hub antenna.

8. A system for mitigating effects of interference for fixed transmitter and receiver unlicensed RF band data transmissions, said system comprising:

means for locating at least a direction of a source of any interference with transmission to and from at least one receiver of said data transmissions;

means for scanning said interference to determine, a frequency and bandwidth of said interference;

means for determining any periodicity of said interference; and means for generating a data transmission antenna pattern with a null toward said interference during said interference.

9. The system of claim 8 wherein said means for generating a data transmission antenna pattern comprises means for creating a plurality of narrow antenna beams.

10. The system of claim 9 wherein said null is generated by creating antenna beams in directions other than the direction of said interference, during said interference.

11. The system of claim 9 wherein an alternate channel narrow antenna beam is created in the direction of said receiver in a direction of said interference, during said interference.

12. The system of claim 11 wherein said channel comprises a frequency and a polarization.

13. The system of claim 8 further comprising means for directing at least one of said receivers in a direction of said interference to establish data transmissions with an alternate hub antenna.

14. A system for mitigating the effects of interference in an unlicensed RF band for point to multipoint data transmissions, said system comprising:

at least one multibeam antenna locating interference with transmission to and from at least one subscriber of said data transmissions; and at least one scanner determining, a frequency, bandwidth and any periodicity of said interference;

wherein a data transmission antenna pattern with a null in the direction of said interference is generated during a period of said interference.

15. The system as defined in claim 14 wherein said data transmission antenna pattern is generated by said multibeam antenna.

16. The system of claim 15 wherein said multibeam antenna generates a plurality of narrow antenna beams.

17. The system of claim 16 wherein said null is created by generating antenna beams in directions other than the direction of said interference, during said interference.

18. The system of claim 16 wherein an alternate channel narrow antenna beam is created in the direction of said receivers in a direction of said interference, during said interference.

19. The system of claim 18 wherein said channel comprises a frequency and a polarization.

20. The system as defined in claim 15 comprising a switch responsive to said scanner, disposed to control input to said antenna.

21. The system as defined in claim 14 further comprising a separate scanner for each antenna beam.

22. The system as defined in claim 14 wherein at least one of said subscribers in a direction of said interference is directed to establish data transmissions with an alternate hub antenna.

* * * * *